Oct. 27, 1942.  H. B. RICE  2,300,135

FLEXIBLE JOINT FOR FLOUR SIFTERS

Filed June 3, 1939

INVENTOR.
HARRY B. RICE.
Jesse R. Stone
Lester B. Clark
ATTORNEYS

Patented Oct. 27, 1942

2,300,135

UNITED STATES PATENT OFFICE 2,300,135

FLEXIBLE JOINT FOR FLOUR SIFTERS

Harry B. Rice, Houston, Tex., assignor to Mission Rubber Company, Houston, Tex., a corporation of Texas Application June 3, 1939, Serial No. 277,195

2 Claims. (Cl. 209—240)

The invention relates to a flexible connection between a vibrating flour sifter or other vibrating devices from which material is to be discharged and the stationary conduit or pipe into which the material is to flow.

With devices of the type above noted and particularly a flour sifter, the powdered material usually leaks thru the type of connection now in general use or escapes around the ends of the connection and it is therefore one of the objects of the invention to provide a sleeve of a suitable material which will have an inherent resiliency so as to maintain a tight connection about the discharge spout and the end of the conduit and at the same time to prevent leakage thru the sleeve, sock or stocking as it usually is termed in the flour milling art.

It is one of the objects of the invention to provide a rubber sleeve to be used as a sock for flour sifters so as to prevent leakage of flour as it passes from the sifter.

Another object of the invention is to use the beaded end on the discharge spout from flour sifters and upon the end of the conduit which receives the flour so that a rubber sleeve fitted over these pipes will securely grip the end of the pipe and provide a seal therewith.

Another object of the invention is to provide a rubber sock for flour sifters which has an elastic band of greater thickness adjacent the end thereof and wherein the body of the sleeve gradually thickens as it approaches the end band.

Another object of the invention is to provide a sock for flour sifters which may be made of a flexible material such as cellulosic product such as a transparent cellulosic film which can be held in place by an elastic band.

Another object of the invention is to provide an invention for flour sifter socks wherein a resilient cushion is provided about the spout on the sifter, the flexible sleeve passed thereover and an elastic band then positioned over the outside of the flexible sleeve so as to hold it in sealing position.

A still further object of the invention is to provide a sock for flour sifters wherein the ends are of less diameter than the body so that the ends may be stretched and passed over the discharge spouts without subjecting the body of the sock to stretching.

Still another object of the invention is to provide a sock for flour sifters which will automatically grip the spout so as to form a seal therewith and which will be non-porous and dust tight.

Another object of the invention is to provide a sock for flour sifters which can be readily removed and repaired and replaced while the sifter is maintained in operation.

Other and further objects of the invention will be readily apparent when the following drawing is considered in connection with the description thereof in which.

Figure 2:
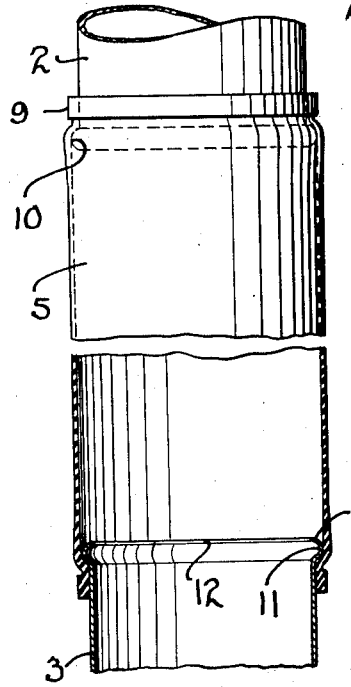
Fig. 2 shows the sock in elevation connected to the spout of the sifter and the conduit which carries the material away from the sifter.

In the grinding of various materials it is necessary to pass them thru a suitable sifter to insure that the material is ground to the proper fineness. When such material is flour and the ground flour is passed thru a stack of sieves generally designated as a sifter and discharges from a spout at the base thereof, the sifter usually vibrates laterally at a relatively high rate of speed and it is necessary therefore to connect the spout of the vibrating sifter with a stationary pipe or conduit by which the material is carried away from the sifter. Such an arrangement is best illustrated in Fig. 2 wherein the discharge spout 2 of the sifter is arranged in spaced relationship with respect to the pipe 3 which is a conduit thru which the material is to pass.

It will be understood that the pipe 2 of the sifter is vibrating at a high rate of speed such as 180 strokes per minute and may have a movement such as one inch on each side of its central position. In the past sleeves or socks of leather or canvas have been generally provided and these sleeves were laced in position or otherwise attached, but the present invention contemplates the use of a non-porous sleeve so that none of the flour or dust can permeate the sleeve and whereby a seal is also maintained at the ends of the sleeve about the spout and about the pipe. In this manner there will be no opportunity whatever for the flour or other material to filter thru the sock or to otherwise escape.

Figure 1:
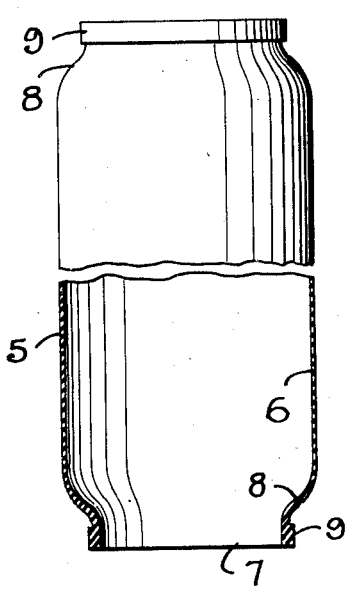
Fig. 1 is a side elevation of the sleeve or sock showing certain parts in section.

In Fig. 1 a sleeve or sock 5 has been illustrated which in the present form is a sleeve of molded rubber or other suitable resilient material. This sleeve is especially constructed in a solitary integral unitary piece and is so arranged that the body portion 6 thereof is of uniform diameter whereas the end 7 is of somewhat smaller diameter.

Particular attention is directed to the fact that the body portion 6 is gradually thickened where it is reduced in area as at 8 and terminates in an elongated band 9 at its smallest diameter. Both ends of the sleeve are formed in the same manner.

In Fig. 2 the discharge spout of the sifter has been illustrated as being formed with an enlarged bead 10 which is best seen in section on the end of the pipe 3 at the lower end of Fig. 2. This bead 10 on the pipe 3 is identical with the bead 10 on the pipe 2. This bead is formed by expanding the pipe outwardly in a substantial semicircular formation when viewed in section so that the greatest diameter thereof at 11 forms a smooth curved surface, whereas the extreme end 12 extends inwardly to provide a rounded edge so that the body 6 of the sleeve will not be cut or damaged as it vibrates relative to the pipe. The same construction is formed in the bead 10 on the end of the spout 2.

To attach the sock 5 the ends will be expanded sufficiently to pass over the bead 10 on the pipes 2 and 3 and allowed to contract about the body of the pipe beyond the bead. The band 9 will be of sufficient thickness to have an inherent elasticity which will cause it to grip the pipe very firmly so that the sleeve or sock is automatically held in place and provides a seal about the pipe to prevent the escape of flour or dust.

The sleeve is impervious and prevents the filtering of dust therethru. An advantage of a sock of this sort is that it can be molded in one piece with the smaller ends so that it can be quickly attached. It is self-sealing without the use of any clamps so that it can be readily removed or replaced while the machine is in operation. If desired it can be mended by patching in a very few moments. It is made of rubber or other suitable material which can be washed and put in operation within a very few minutes so that it is clearly more sanitary than the fabric or canvas sleeves now generally in use. The resilient nature of the material will afford a very extended life and the fact that it is non-porous prevents the escape of dust or flour about the mill. If desired the sleeve can be made in more than one part and suitably cemented together or it can be made up in various lengths and the center portion suitably connected with cement to provide a sock of desired length.

Figure 3:
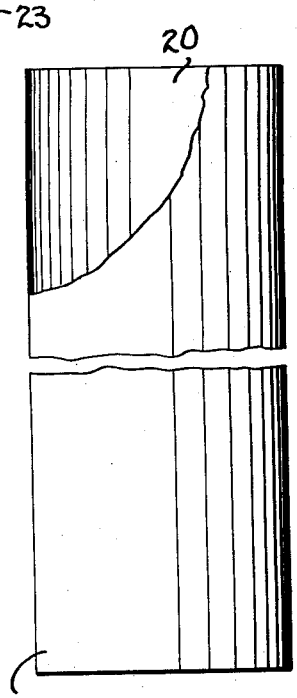
Fig. 3 shows a modified form of the invention wherein a straight sleeve of flexible material such as cellulosic product such as a transparent cellulosic product is used.
Figure 4:
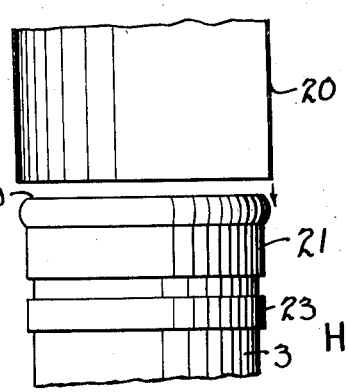
Fig. 4 shows the manner of attaching the Cellophane sleeve of Fig. 3.

In Fig. 3 a sock 20 has been illustrated which may be a cellulosic product such as a transparent cellulosic film or other suitable flexible material which is non-porous. This sleeve may come in tubular form in any desired length and may be cut off to the length desired as seen in Fig. 3. The pipe 3 in Fig. 4 is the same as the pipe 3 in Fig. 2 except in order to provide a suitable seal about the end of the pipe a coating of rubber 21 or other resilient material has been applied to the end of the pipe. This material is best seen in section in Fig. 5 and extends over the body portion 10 and is arranged to receive the inside surface of the sleeve 20.

Figure 5:
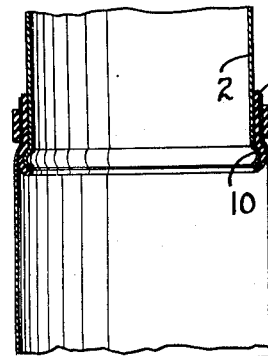
Fig. 5 shows the sleeve of Figs. 3 and 4 sealed in operating position.

In order to hold the sleeve 20 in position a rubber band 23 has been previously passed over the pipe 3 as viewed in Fig. 4. This band is moved downwardly along the pipe beyond the resilient seat 21 so that when the sleeve 20 is passed over the end of the pipe to engage the seat 21 then the band 23 may be stretched and moved upwardly again over the end of the sleeve 20. The final position is best seen in Fig. 5 where the sleeve 20 is securely gripped between the resilient seat 21 and the elastic band 23. In this manner a seal is provided, yet the seal can be readily detached or removed. The upper end of the sleeve 20 is shown as attached in a similar manner to the spout 2 of the sifter.

A flexible as distinguished from a resilient sleeve may be satisfactory because it can be made in three pieces to be quickly attached with the rubber cushion over the end of the metal spout. A sleeve of this sort may be transparent if desired so that the operator may observe the material which is being sifted or bolted as it passes thru the sleeve. The rubber seat and the rubber band to hold the sleeve in position prevents any slipping of the sleeve or leakage of the material and the same sanitary conditions prevail as are presented in connection with the rubber sleeve of Fig. 1.

What is claimed is:

1. The combination with a flour sifter having a discharge spout where the sifter and spout are vibrating with relation to a stationary conduit of a flexible sock to connect the spout and conduit, a resilient covering about the end of each the spout and conduit, a flexible sock of flexible transparent cellulosic film connecting the spout and conduit and overlying the resilient material, and means to retain said sock in position.

2. The combination with a flour sifter having a discharge spout where the sifter and spout are vibrating with relation to a stationary conduit of a flexible sock to connect the spout and conduit, a resilient covering about the end of each the spout and conduit, a flexible sock of flexible transparent cellulosic film connecting the spout and conduit and overlying the resilient material, and means to retain said sock in position, including a resilient band at each end.

HARRY B. RICE.